United States Patent [19]
Cosenza

[11] Patent Number: 5,366,330
[45] Date of Patent: Nov. 22, 1994

[54] FASTENER HEAD WITH INTERNAL RECESS HAVING A RADIAL SLOT CONFIGURATION AND INSTALLATION TOOL THEREFOR

[75] Inventor: Frank J. Cosenza, Santa Barabara, Calif.

[73] Assignee: VSI Corporation, Chantilly, Va.

[21] Appl. No.: 96,233

[22] Filed: Jul. 26, 1993

[51] Int. Cl.⁵ .................. F16B 23/00; F16B 35/06
[52] U.S. Cl. ................................. 411/405; 411/407; 411/919; 81/176.15
[58] Field of Search ............... 411/403, 404, 405, 407, 411/410, 919; 81/176.15

[56] References Cited

U.S. PATENT DOCUMENTS

| | | | |
|---|---|---|---|
| 2,129,440 | 9/1938 | Olson | 411/404 |
| 3,331,274 | 7/1967 | Walton | 411/403 |
| 3,604,305 | 9/1971 | Dreger | 411/919 X |
| 3,969,974 | 7/1976 | Lejdegard | 411/405 |
| 4,202,244 | 5/1980 | Gutshall | 411/404 |

*Primary Examiner*—Neill R. Wilson
*Attorney, Agent, or Firm*—Irving Keschner

[57] ABSTRACT

A fastener head having a pair of recesses formed therein, a ledge in each recess being located a short distance axially below the head surface and extending a predetermined angular length from the axial portion of the ledge. The dimension of the ledge is adjustable to accommodate the strength of the fastener material in a manner such that the displacement formation of recess material on the surface of the fastener head is prevented during normal installation procedures. The drive angle on the recess is designed to be zero degrees.

18 Claims, 3 Drawing Sheets

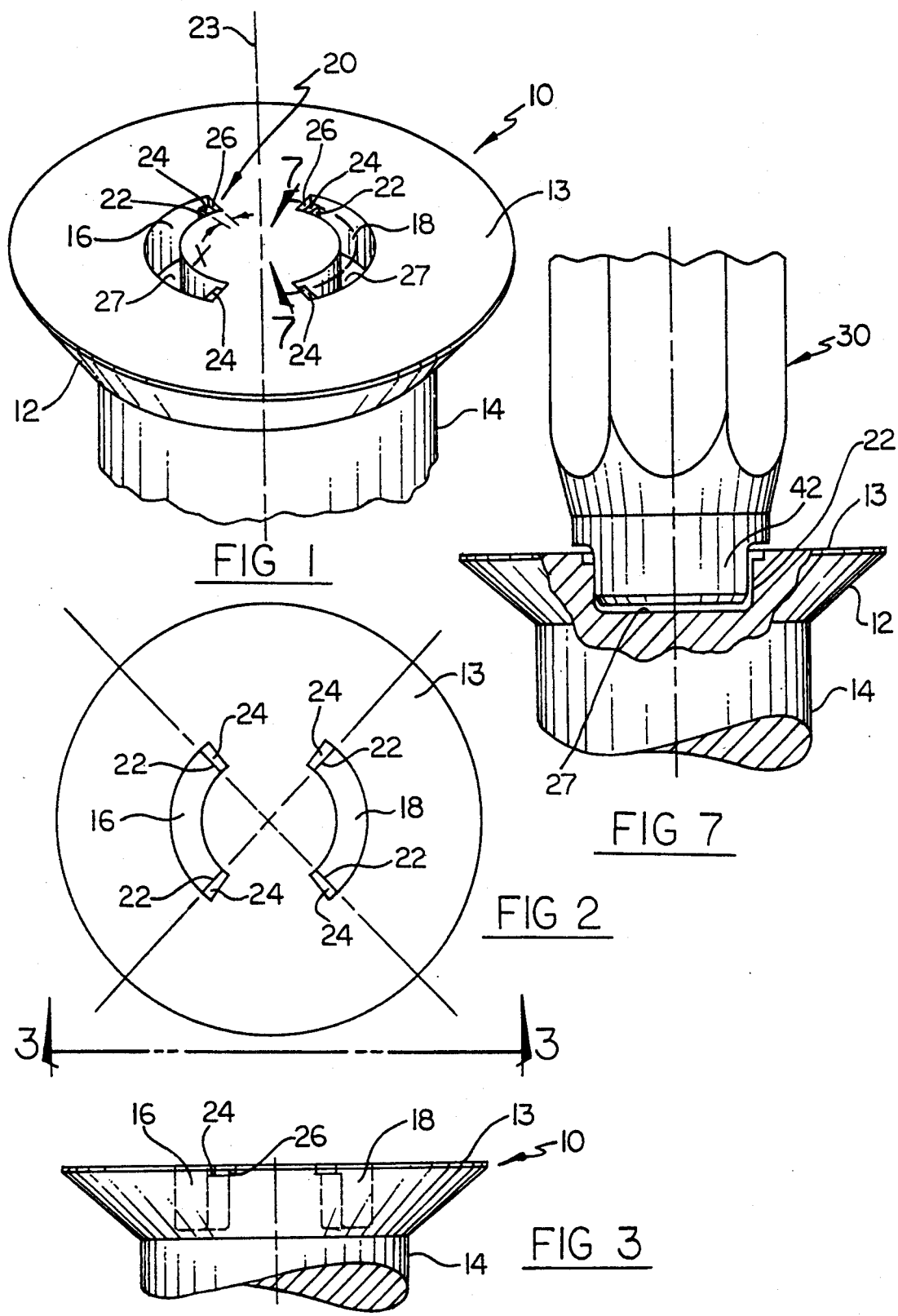

FASTENER HEAD WITH INTERNAL RECESS HAVING A RADIAL SLOT CONFIGURATION AND INSTALLATION TOOL THEREFOR

BACKGROUND OF THE INVENTION

1. Field of the Invention.

The present invention relates to recessed fastener heads and, in particular, to a fastener head having a pair of recesses each recesses having a ledge formed below the head surface.

2. Description of the Prior art.

Most prior art internal wrenching recesses perform adequately when installation and removal torque loads are low and if the fastener material is at higher strength levels. Often at these higher strength levels the results of repeated usage shows some recess distortion and indications of recess material displacement. However, when the same recess is fabricated from a softer material that has high malleability characteristics, one torsional cycle often is sufficient to deform the recess configuration to cause the raised material (burrs) to appear on the fastener head surface. Repeated drive tool usage often results in camout and destruction of the recess making the fastener useless. Deformation of the recess usually begins at the junction of the recess and the surface head of the fastener, and displays itself by a deformed edge of raised material. This raised material is unsightly, can inflict some minor physical damage to persons who contact the area where the fastener is installed, and with regards to aerodynamic smoothness, is unacceptable.

All materials will deform to some extent when the load exceeds the yield point, but if the load is constant for all materials, it becomes readily obvious that softer materials will deform much more easily than harder materials. Currently available internal driving recesses do not take in account fastener material strength in order to minimize recess deformation and are configured identically the same for soft or hard materials. In other types of recesses, the installation tool is inserted into the mating internal wrenching recess. As torque is applied, contact between the tool's driving surface is resisted by the recess reacting surface. As torque increases and the fastener is seated, continuous torque could cause deformation to the upper surface of the recess. The reason for the deformation is the fact that this is the portion of the recess that has the weakest unsupported area and is susceptible to movement.

It is also noted that some prior art fastener recesses have drive angles ranging from fifteen to ninety degrees. The drive angle is the resultant radial force transmitted by the wrenching tool to the fastener material of the recess. As an example, the hexagon recess internal wrenching tool, commercially available, has six external corners. When these corners engage a mating hexagon recess, the applied torque load is divided between a torsional and radial direction. The drive angle for a hexagon recess is thus sixty degrees which exerts more loads radially rather than the desired tangential loading. This hexagon drive angle manifests itself by imposing very high radial forces to the recess, which in many instances encourages camout especially in softer materials. Recesses that have more than two driving surfaces have to deal with the problem of tolerancing and concentricity of the installation tool and the recess. Thus, if there is a slight discrepancy or difference in dimensions, angularity or concentricity, one portion of the driving tool will engage only one portion of the mating recess. This can contribute to premature tool breakage because the torque load is concentrated and unbalanced on one segment of the recess and causes it to deform.

An example of a prior art fastener which has a specific recess configuration is disclosed in U.S. Pat. No. 4,202,244 to Gutshall, which shows a head recess having a cruciform configuration and an annular groove or indent encircling about seventy-five percent of the periphery of the socket portion between each quarter portion of slots, the recess being designed to interact with a conventional cruciform driving tool or flat bladed screw driver. The recess described in this patent has the disadvantages noted hereinabove. A technique for preventing burrs from forming on the tool driving area of a fastener is disclosed in U.S. Pat. No. 3,969,974 to Lejdegard. Flats formed on the external wrenching surface allows displaced metal to build up on the flat instead of forming a burr on the outer cylinder surface.

What is therefore desired is to provide a new fastener recess which minimizes burrs on the surface of the fastener head, the recess drive angle being reduced to substantially zero degrees to minimize installation tool radial force loading and thus camout and wherein the number of driving surfaces is reduced to minimize problems of tolerance and concentricity.

SUMMARY OF THE PRESENT INVENTION

The present invention provides an internal wrenching recess for fasteners or other devices that resists deformation when fabricated from soft or hard materials when torqued to high values.

In order to prevent deformation of the recess and its adjacent surface, a step or ledge is formed in the recess to allow some deformation of the soft material of the recess but contains it sufficiently so as not to raise a surface burr. The ledge is located a short distance axially from the head surface of the fastener. The ledge extends a predescribed length angularly from the axial portion of the ledge and is determined as a function of the bearing yield strength of the fastener material. The ledge dimensional distance is mathematically and empirically determined as to how much it will yield or deform under a given load. The bearing yield point of the fastener material thus determines the length of the ledge. As a result, when this recess is used in a high strength material, the ledge will be small, but when the material possesses lower strength then the ledge is larger. By including the ledge of the present invention, a section of material is located slightly below the fastener head surface and horizontally in a angularly distance away from the original position of the recess. Each radial slot formed in the head has ledges extending from both ends of the slot. As torque is applied, the subsequent deformation or movement of material axially is now captured below the surface of the fastener head. It should be noted that this ledge configuration need not be ninety degrees, it also can be effective with larger angles or a radiused corner. The ledge can also withstand mis-angularity of the wrenching tool in both the insertion and removal mode of operation which often occurs outside the confines of a testing laboratory. In particular, access to the driving recess in field usage is traditionally located in the most obscure angled position, these positions usually amplifying the distortion and often resulting in deformed recesses and broken tools.

The preferred drive angle on the recess is zero degrees, avoiding the typical high radial loading of prior art recesses which in turn minimizes the possibility of installation tool camout in softer fastener materials. This design of the present invention transfers the full load to the vertical portion of the "step" of the recess. This vertical portion of the ledge is preferably located directly on the radial centerline of the fastener. As a torque load is applied to the recess, loads are not imposed either radially outward or radially inward. It acts as a "couple" and all applied torque loads utilized are purely rotational and not dissipated elsewhere. Another unique feature is that this recess balances the installation or removal torque equally. Since this recess has only two wrenching surfaces, all torque loads are automatically and equally distributed.

The present invention also provides a tool specifically designed to install or remove a fastener having a recess with the internal recess configuration as set forth hereinabove.

A fastener recess having radial slots with ledges formed therein as described hereinabove provides a simple and cost effective technique to minimize burr formation, virtual elimination of tool camout and a zero degree drive angle to compensate for misalignment of the wrenching tool.

DESCRIPTION OF THE DRAWINGS

For a better understanding of the invention as well as other objects and further features thereof, reference is made to the following description which is to be read in conjunction with the accompanying drawing wherein:

FIG. 1 is a perspective view of a fastener head provided with the recess of the present invention;

FIG. 2 is a top plan view of the fastener head of FIG. 1;

FIG. 3 is a view along line 3—3 of FIG. 2;

FIG. 7 is a partial sectional side view showing the engagement of the driving tool and a slot in the recess of the head in the installation mode.

DESCRIPTION OF THE INVENTION

Figure 4:
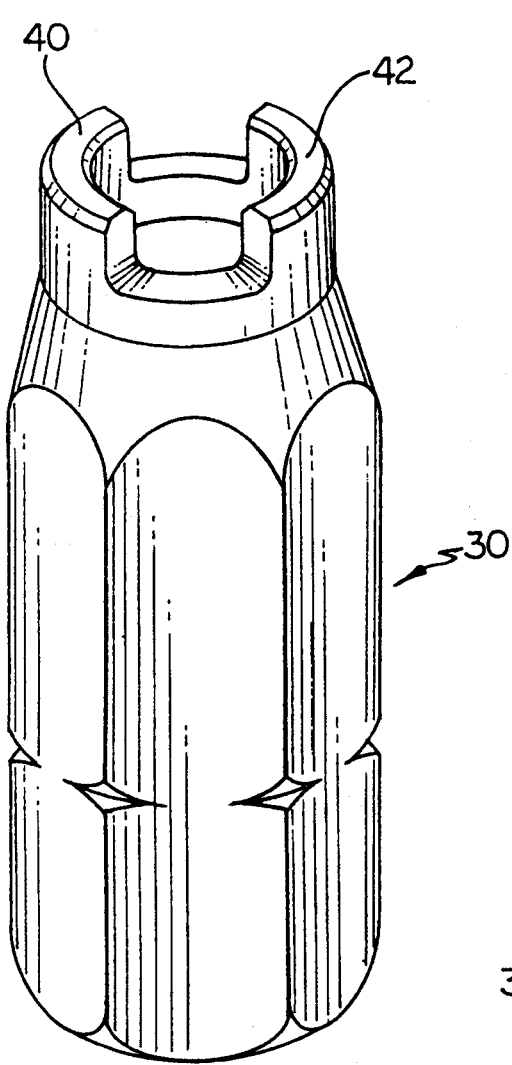
FIG. 4 is a perspective view of the driving tool fabricated in accordance with the teachings of the present invention.
Figure 5:
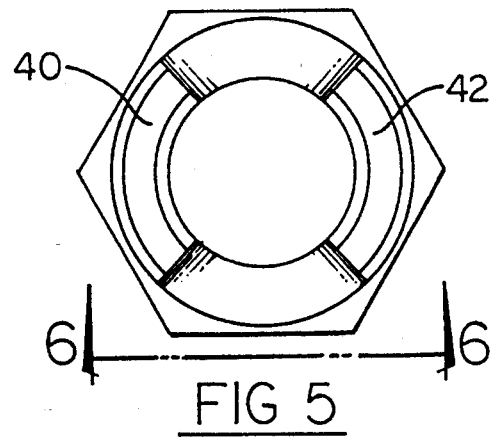
FIG. 5 is a top plan view of the tool of FIG. 4.
Figure 6:
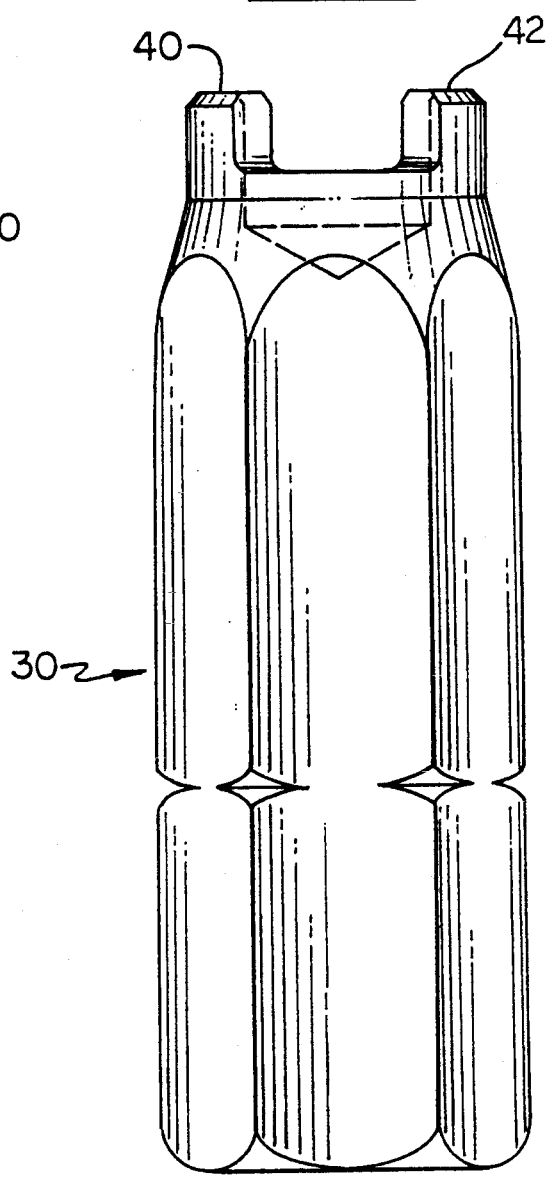
FIG. 6 is a view along line 6—6 of FIG. 5.

Referring now to FIGS. 1-3, a screw or similar fastener 10 is provided with head 12 having a flat surface 13 and threaded shank portion 14. Head 12 is provided with two radial recesses, or slots, 16 and 18, slots 16 and 18 being identical and a geometrical mirror image of each other about the axis 23 of fastener 10. Each recess has steps, or ledges, 20 formed therein. The step comprises a substantially vertical face portion 22 which preferably extends in a direction parallel to the longitudinal axis 23; a horizontal portion 24 and a second vertical portion 26 which also extends in a direction parallel to the longitudinal axis of fastener 10, vertical portion 26 terminating at one end in an arcuate portion 27, coplanar with surface 13. Portion 26, in a preferred embodiment, extends a predetermined distance downwardly from the surface 13 of head 12. Portion 24 extends a predetermined distance x angularly from portion 22 and is determined as a function of the bearing yield strength of the fastener 10 material. The ledge distance (length) x is mathematically and empirically determined as to how much it will yield or deform under a given load. In essence, the bearing yield point of the fastener 10 material determines the length x. As a result, when the fastener is fabricated from a high strength material, the length x is small; when the fastener is fabricated from a low strength material, the length x is larger.

For example, if the fastener 10 material is high strength, x is preferably in the range from about one percent to about five percent of the fastener thread major diameter; if the fastener 10 material is low strength, x is preferably in the range from about six percent to about fifteen percent of the fastener thread major diameter.

Figure 8A:
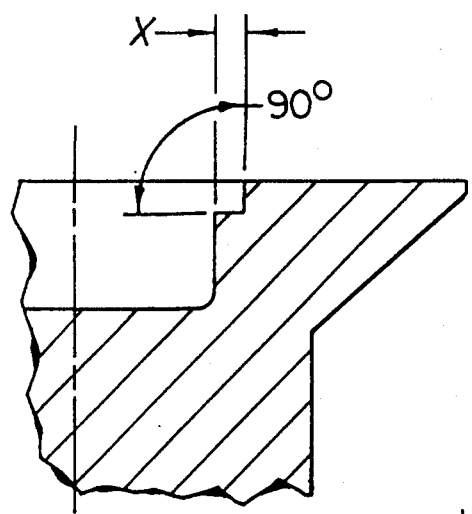
FIGS. 8a–8c illustrate examples of the ledge configurations which can be utilized in the fastener head recesses of the present invention.
Figure 8B:
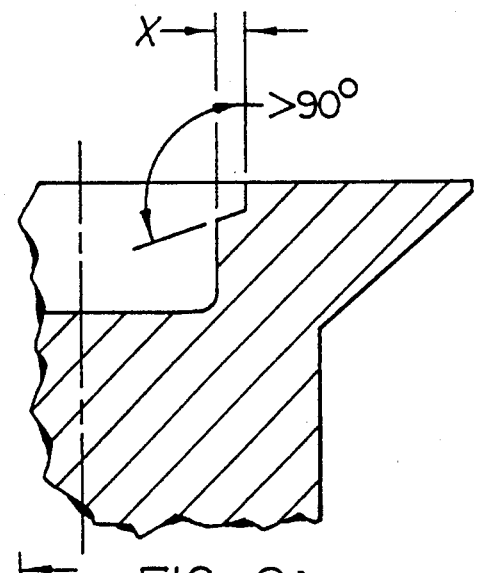
Figure 8C:
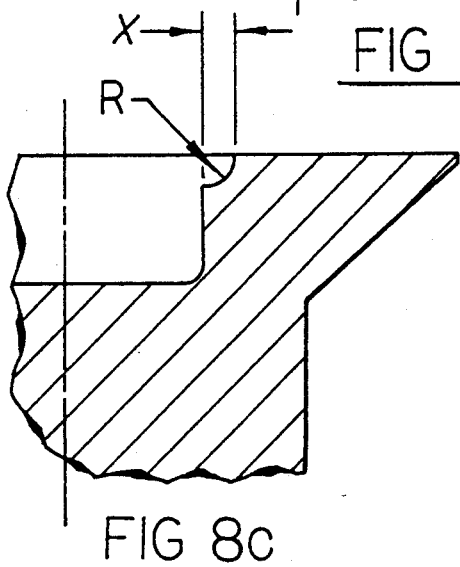

By including the ledge of the present invention, a section of the fastener material is located slightly below the surface 13 of fastener head 12 and horizontally an angularly distance away from the edges of the radial slots 16 and 18. As torque is applied by the tool 30 (FIG. 7), the subsequent deformation or movement of material axially is now captured below the surface of the fastener head 12. It should be noted that ledge portions 24 need not be perpendicular to the longitudinal axis 23 of fastener 10 (ninety degrees) as shown in FIG. 8a, but also can be effective with larger angles (FIG. 8b) or a radiused corner (FIG. 8c). The ledge can also withstand mis-angularity of the wrenching tool 30 in both the insertion and removal mode of operation which often occurs outside the confines of a testing laboratory. In particular, access to the driving recess in field usage is traditionally located in obscure angled positions which typically amplify the distortion and often results in deformed recesses and broken tools.

Referring now to FIG. 2, the surface 22 on the recess is located on the fastener as a radial line from the center of the circle or fastener diameter. When tool 30 engages surface 22, the torque load imposed is tangential. As a result this design does not allow for any loading to the radial parallel walls of slots 16 and 18. Subsequently the drive angle is zero degrees and avoids the typical high radial loading of prior art recesses which in turn minimize the possibility of installation tool camout in softer materials, the recess acting as a couple such that all applied torque loads utilized are purely rotational and not dissipated elsewhere. The recess of the present invention also balances the installation or removal torque equally. In particular, since only two wrenching surfaces are used, all torque loads are automatically and equally distributed. The depth of each recess 16 and 18 (from surface 13 to portion 27) is preferably in the range from about 0.3 millimeters to about 9.0 millimeters, depending upon desired torque loads, fastener material and fastener size.

Wrenching tool 30, shown in FIGS. 4–7, is designed to be effective in installing and removing a fastener having the configuration of recesses 16 and 18 shown in FIGS. 1-3. The engagement portion of tool 30 comprises radial extensions 40 and 42 which are inserted into radial slots 16 and 18 for installation or removal of fastener 10 as shown in FIG. 7.

During the installation or removal procedure, all of the drive force (torque) is applied to vertical wall portions 22. Any material which is forced upwardly tends to build up on the horizontal step portion 24 such that the displaced metal does not form a burr on the surface 13 of head 12 but tends to build-up in the interior portion of the slots, thus not interfering with an aerodynamic smooth surface. It should be noted that only one tool is required for each size of this recess regardless of the variations of the x dimension. More importantly, by proper selection of the ledge dimension x, a single recess design can be utilized to minimize burr formation, regardless of the bearing ultimate strength of the fastener material. If the torquing load applied by the tool during installation is greater than the recess safety factor, the extensions 40 and 42 will fail insuring that a fastener can not be installed with burrs on the fastener head surface.

A fastener recess having radial slots with ledges formed therein as described hereinabove provides a simple and cost effective technique to minimize burr formation, virtual elimination of tool camout and a zero degree drive angle to compensate for misalignment of the wrenching tool by minimizing high radial loads.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a fastener having a first recess formed in its head, said recess adapted to engage a torque providing tool, the improvement wherein said first recess comprises a radially shaped first wall portion, a radially shaped second wall portion spaced from said first wall portion, first and second end wall portions extending in a direction substantially parallel to the axis of said fastener for a first predetermined distance from the surface of said fastener head; third and fourth end wall portions extending in a direction substantially parallel to the axis of said fastener for a second predetermined distance and ledge portions extending in a predetermined radial distance in a plane that is parallel with said head surface, said ledge portions joining said first and second end wall portions to said third and fourth end wall portions, respectfully.

2. The fastener of claim 1 wherein a tool having a driving edge enters said first recess between said first and second wall portions and said third and fourth end wall portions creates a frictional engagement between said tool and said fastener.

3. The fastener of claim 1 wherein the drive angle of said first recess is substantially zero degrees.

4. The fastener of claim 1 wherein said fastener includes a second recess spaced from said first recess and configured identically and arranged to be a geometrical mirror image of said first recess.

5. The fastener of claim 4 wherein said third end wall portion of said first recess is on the same fastener centerline as the third end wall portion of said second recess and wherein said fourth end wall portion of said first recess is on the same fastener centerline as the fourth end wall portion of said second recess.

6. The fastener of claim 1 wherein the ends of said ledge portions contact the adjacent first and second wall portions.

7. The fastener of claim 1 wherein said fastener is made of a material having a first bearing yield strength and wherein said ledge portion radial distance is equal to x.

8. The fastener of claim 7 wherein said fastener is made of a material having a second bearing yield strength which is less than said first bearing yield strength and wherein said ledge portion radial distance is equal to y and wherein y is greater than x.

9. The fastener of claim 7 wherein said fastener is made of a material having a second bearing yield strength which is greater than said first bearing yield strength and wherein said ledge portion radial distance is equal to y and wherein y is less than x.

10. The fastener of claim 9, wherein y is in the range from about one percent to about five percent of the fastener thread major diameter.

11. The fastener of claim 8 wherein y is in the range from about six percent to about fifteen percent of the fastener thread major diameter.

12. A tool for engaging a fastener having a first recess formed in its head, said first recess comprising a radially shaped first wall portion, a radially shaped second wall portion spaced form said first wall portion, first and second end wall portions extending in a direction substantially parallel to the axis of said fastener for a first predetermined distance from the surface of said fastener head; third and fourth end wall portions extending in a direction substantially parallel to the axis of said fastener for a second predetermined distance and ledge portions extending a predetermined radial distance in a plane that is parallel with said head surface, said ledge portions joining said first and second end wall portions to said third and fourth end wall portions, respectively, said tool having a first driving edge which enters said first recess between said first and second wall portions and said third and fourth end wall portions creating a frictional engagement between said tool and said fastener.

13. The tool of claim 12 wherein said fastener includes a second recess spaced from said first recess and configured identically and arranged to be a geometrical mirror image of said first recess, said tool having a second driving edge which enters said second recess between said first and second wall portions and said third and fourth end wall portions creating a further frictional engagement between said tool and said fastener.

14. The tool of claim 12 wherein said fastener is made of a material having a first bearing yield strength and wherein said ledge portion radial distance is equal to x.

15. The tool of claim 14 wherein said fastener is made of a material having a second bearing yield strength which is greater than said first bearing yield strength and wherein said ledge portion radial distance is equal to y and wherein y is less than x.

16. The tool of claim 14 wherein said fastener is made of a material having a second bearing yield strength which is less than said first bearing yield strength and wherein said ledge portion radial distance is equal to y and wherein y is greater than x.

17. The tool of claim 13 wherein said third end wall portion of said first recess is on the same fastener centerline as the third end wall portion of said second recess and wherein said fourth end wall portion of said first recess is on the same fastener centerline as the fourth end wall portion of said second recess.

18. The tool of claim 12 wherein the ends of said ledge portions contact the adjacent first and second wall portions.

* * * * *